United States Patent [19]

Beall et al.

[11] 4,164,610

[45] Aug. 14, 1979

[54] GLASSES EXHIBITING HIGH LITHIUM ION MOBILITY

[75] Inventors: George H. Beall, Big Flats; Richard F. Reade, Corning, both of N.Y.

[73] Assignee: Corning Glass Works, Corning, N.Y.

[21] Appl. No.: 903,553

[22] Filed: May 8, 1978

Related U.S. Application Data

[63] Continuation-in-part of Ser. No. 799,190, May 23, 1977, abandoned.

[51] Int. Cl.$^2$ .......................... C03C 3/14; C03C 3/18; H01M 6/18
[52] U.S. Cl. ............................. 429/193; 106/47 R; 429/104
[58] Field of Search .............. 106/47 R; 429/104, 193

[56] References Cited

U.S. PATENT DOCUMENTS

| | | | |
|---|---|---|---|
| 2,764,492 | 9/1956 | Weissenberger et al. | 106/47 R |
| 3,061,752 | 10/1962 | Banks | 106/47 R |
| 3,390,021 | 6/1968 | Michael | 106/47 R |
| 3,829,331 | 8/1974 | Tsang | 106/47 R |
| 3,877,995 | 4/1975 | Levine et al. | 106/47 R |
| 3,980,499 | 9/1976 | Bither et al. | 429/104 |

*Primary Examiner*—Helen M. McCarthy
*Attorney, Agent, or Firm*—Clinton S. Janes, Jr.

[57] ABSTRACT

The present invention relates to the preparation of essentially silica-free glasses which can be melted at low temperatures and which have compositions within the $Li_2O$—$Al_2O_3$ and/or F—$B_2O_3$ system. The glasses exhibit very high lithium ion mobility which, resulting in low electrical resistivity, has led to their consideration as solid membrane electrolyte-separators in such devices as the lithium metal-sulfur battery.

1 Claim, No Drawings

GLASSES EXHIBITING HIGH LITHIUM ION MOBILITY

This application is a Continuation-in-Part of Ser. No. 799,190, filed May 23, 1977 now abandoned.

BACKGROUND OF THE INVENTION

A relatively recent advance in the field of battery cells, and most significantly in the field of secondary battery cells, i.e., cells which can be discharged and electrically re-charged through numerous cycles without substantial injury thereto, has been the development of alkali metal-sulfur batteries. That type of battery is described in such United States patents as U.S. Pat. Nos. 3,404,035, 3,476,602, and 3,829,331.

Those battery cells can be generally described as consisting of three elements: a liquid anode, a liquid or paste cathode, and an electrolyte-separator or membrane. Commonly, the anode is composed of a melt of one or more alkali metals, alkali metal amalgams, or alkali metal alloys. The cathode consists of sulfur, at least some of which is in the molten state, and which contains cations of the alkali metal dispersed therein. The cations in the cathode are frequently accompanied by a substantially equivalent proportion of anions that may be derived from the cathode material. The membrane, which has customarily been fabricated from glass or beta-alumina ceramics, must be selectively permeable to the cations of the alkali metal and acts to separate the anode and cathode compartments. The membrane has been further characterized as having the capability of transmitting ions of the anode metal between the anode and cathode compartments, but being relatively impermeable to, and non-transmitting of, molecules of the anode metal, electrons, and ions or molecular species of the cathode. After properly positioning the anode, cathode, and electrolyte-separator within a liquid and vapor tight case, the battery unit is completed by connecting electrically-conducting leads to the anode and cathode. The structure of such batteries has been described in, for example, U.S. Pat. Nos. 3,404,035 and 3,476,602. Numerous glass compositions have been investigated to serve as the electrolyte-separator, the most successful being $Na_2O$-containing, essentially $SiO_2$-free glasses, such as are illustrated in U.S. Pat. No. 3,829,331.

Whereas the bulk of the previous research effort has involved the use of a liquid sodium metal anode and a liquid sulfur-sodium sulfide mixture as the cathode, more recently, considerable interest has been generated in developing a similar type battery unit but wherein liquid lithium would replace liquid sodium as the anode and a liquid sulfur-lithium sulfide mixture would constitute the cathode. Such a battery possesses the practical advantage of lower operating temperatures than the sodium battery. In short, the operating mechanism of the battery is similar to that of the liquid sodium-sulfur battery, but lithium rather than sodium comprises the alkali metal component.

OBJECTIVE OF THE INVENTION

The primary objective of this invention is to provide stable, low melting $Li_2O$-containing glasses which, because of their low electrical resistivity resulting from high lithium ion mobility, can be considered, inter alia, as suitable for use as solid membrane electrolyte-separators in liquid lithium-sulfur batteries.

SUMMARY OF THE INVENTION

We have found that objective can be achieved through glasses having compositions within the $Li_2O$—$Al_2O_3$ and/or F—$B_2O_3$ system. Binary lithium borate glasses ($Li_2O$—$B_2O_3$) have been described in the prior art with $Li_2O$ contents up to about 24% by weight (43 mole percent) in such publications as Imaoka, M., *Advances in Glasses Technology Part 1*, page 149, Plenum Press, New York, 1962. Nevertheless, because of the great instability of the glasses, i.e., the strong tendency for those glasses to devitrify while cooling from the melt, the glasses of high $Li_2O$ concentrations can only be conveniently melted in samples of a few grams. We have discovered that the incorporation of fluoride ion (F) or alumina ($Al_2O_3$), or both, can markedly decrease this undesirable spontaneous devitrification such that clear glasses can be obtained in large-sized samples employing conventional glass melting and forming techniques, thereby providing practical utility to the glasses. Moreover, the additions of F and $Al_2O_3$ greatly improve the chemical durability of the binary glass without objectionably increasing the electrical resistivity thereof. Thus, the F and/or $Al_2O_3$-containing $Li_2O$—$B_2O_3$ glasses demonstrate comparable and, in some instances, even lower electrical resistivities than sodium borate glasses such as are described in U.S. Pat. No. 3,829,331 as being operable in liquid sodium-sulfur batteries. Finally, the electrical resistivities of the inventive glasses are comparable to or better than those measured for lithium aluminosilicate glasses which have also been investigated for use as electrolyte-separators for liquid alkali metal-sulfur batteries. Moreover, these fluid, low melting borate glasses can impart economic and energy conservation advantages over the more viscous, high temperature aluminosilicate glasses.

The glass compositions exhibiting low electrical resistivity and good chemical durability operable in the instant invention are selected from the following groups, the glasses consisting essentially of the stated proportions expressed in terms of weight percent on the oxide basis as calculated from the batch:

(a) 0–14.1% $Li_2O$, 8.1–29.6% LiF, 12.8–29.6% $Li_2O$+LiF, 0–12.7% LiCl, and 69.3–87.2% $B_2O_3$; and (b) 0–27.5% $Li_2O$, 0–19.3% LiF, 12.2–28.6% $Li_2O$+LiF, 0–13.9% LiCl, 0–18.6% $Al_2O_3$, but <10% $Al_2O_3$ when F and/or Cl are absent and $Li_2O$ is no more than 20%, 0–21.8% $AlF_3$, 5.9–22.4% $Al_2O_3$+$AlF_3$, and 54.3–79.5% $B_2O_3$.

The most preferred compositions will exhibit electrical resistivities in terms of Log $\rho$ measured at 25° C. of less than 11. Such glasses are selected from the following groups, the compositions consisting essentially of the stated proportions expressed in terms of weight percent on the oxide basis as calculated from the batch:

(a) 0–9.1% $Li_2O$, 14.4–27.1% LiF, 18–29.5% $Li_2O$+LiF, 0–12.7% LiCl, and 69.3–77.3% $B_2O_3$; and (b) 0–26.0% $Li_2O$, 0–16.9% LiF, 0–13.9% Cl, 17.2–36.3% $Li_2O$+LiF+LiCl, 0–18.6% $Al_2O_3$, but <10% $Al_2O_3$ when F and/or Cl are absent and $Li_2O$ is no more than 20%, 0–14.8% $AlF_3$, 6.2–18.6% $Al_2O_3$+$AlF_3$, and 54.3–75.1% $B_2O_3$.

The formalisms $(LiF)_2$, $(LiCl)_2$, and $(AlF_3)_2$ are used to maintain the lithium equivalence, $Li_2O \sim (LiF)_2$, $Li_2O \sim (LiCl)_2$, and the aluminum equivalence, $Al_2O_3 \sim (AlF_3)_2$, respectively, on a molar basis.

In general, the alkaline earth metal oxides and alkali metal oxides other than $Li_2O$ will be avoided due to their adverse effect upon the desired low electrical resistivity of the glasses.

PRIOR ART

U.S. Pat. No. 3,061,752 discloses glass compositions having electrical resistivities between about $10^{11}$–$10^{12}$ ohms/cm$^3$ and which are especially suitable for the target of an image orthicon tube since they alleviated a "sticking" problem. The operable glasses were encompassed within the general ternary system, expressed in weight percent, of 10–20% Li$_2$O, 10–40% M$_x$O$_y$, and the remainder B$_2$O$_3$. Customarily, M$_x$O$_y$ consisted of one or more metal oxides of the group MgO, CaO, ZnO, and Al$_2$O$_3$. Accordingly, the patent describes glasses consisting of about 10–20% Li$_2$O, 10–40% MgO, CaO, ZnO, and/or Al$_2$O$_3$, and 40–80% B$_2$O$_3$.

The patent contains no reference to fluoride or chloride and the inclusion of alkaline metal oxides in the instant inventive glass compositions is avoided because such can cause a substantial increase in electrical resistivity.

Two working examples were provided in the patent having the following glass compositions expressed in weight and mole percent:

|  | Example No. 1 | | Example No. 2 | |
|---|---|---|---|---|
| Li$_2$O | 14.7 wt. % | 29.9 mole % | 13.44 wt.% | 26.3 mole % |
| Al$_2$O$_3$ | 16.7 | 9.9 | 7.57 | 4.3 |
| B$_2$O$_3$ | 68.6 | 60.2 | 64.02 | 53.8 |
| CaO | — | — | 14.97 | 15.6 |

DESCRIPTION OF PREFERRED EMBODIMENTS

Table I reports a number of glass compositions, expressed in terms of mole percent on the oxide basis, illustrating the compositional parameters of the instant invention. Table IA records the same compositions but expressed in terms of weight percent. The batch ingredients can comprise any material, either the oxide or other compound, which, when melted together with the remaining ingredients, will be converted into the desired oxide in the proper proportions. In the recited compositions, the fluoride ions (and chloride ions) were added as the compound reported in the Table.

The batch ingredients were compounded, ballmilled together to assist in securing good melt homogeneity, and placed in platinum crucibles. The crucibles were then covered, transferred to a furnace operating at 1000°–1150° C., and the batches melted for about 2–4 hours. To further homogenize the melts, they were poured several times from one heated crucible to another before casting. The melts were thereafter cast into steel molds to yield slabs about $\frac{1}{4}"\times 4"\times 10"$ and the slabs immediately moved to annealers operating at 300°–350° C.

The compositions of Table I were sub-divided into four general categories, viz., the Li$_2$O-(LiF)$_2$.B$_2$O$_3$ system, the Li$_2$O.(LiF)$_2$.Al$_2$O$_3$.B$_2$O$_3$ system, the Li$_2$O.(AlF$_3$)$_2$B$_2$O$_3$ system, and the general Li$_2$O-F and/or Al$_2$O$_3$-B$_2$O$_3$ system plus extraneous additions. The compositions in each system are recited in the general order of increasing Li$_2$O level. Thus, Examples 1–17 encompass glasses within the Li$_2$O.(LiF)$_2$B$_2$O$_3$ field, Examples 18–42 include the Li$_2$O.(LiF)$_2$2Al$_2$O$_3$B$_2$O$_3$ glasses; Examples 43–57 constitute the Li$_2$O.(AlF$_3$)$_2$.B$_2$O$_3$ system; and Examples 58–64 recite Li$_2$O—F and/or Al$_2$O$_3$—B$_2$O$_3$ glass compositions with additional extraneous components.

TABLE I (Mole %)

Li$_2$O . (LiF)$_2$ . B$_2$O$_3$ System

|  | 1 | 2 | 3 | 4 | 5 | 6 | 7 | 8 | 9 |
|---|---|---|---|---|---|---|---|---|---|
| B$_2$O$_3$ | 80.0 | 80.0 | 75.0 | 75.0 | 71.4 | 66.7 | 66.7 | 66.7 | 64.0 |
| Li$_2$O | — | 10.0 | — | 12.5 | 14.4 | — | 16.7 | 22.2 | — |
| (LiF)$_2$ | 20.0 | 10.0 | 25.0 | 12.5 | 14.2 | 33.3 | 16.7 | 11.1 | 36.0 |
|  | 10 | 11 | 12 | 13 | 14 | 15 | 16 | 17 |  |
| B$_2$O$_3$ | 64.0 | 64.0 | 60.0 | 60.0 | 66.7 | 66.7 | 66.7 | 66.7 |  |
| Li$_2$O | 18.0 | 27.0 | 20.0 | 15.0 | — | — | — | — |  |
| (LiF)$_2$ | 18.0 | 9.0 | 20.0 | 25.0 | 32.3 | 30.3 | 23.3 | 30.3 |  |
| (LiCl)$_2$ | — | — | — | — | 1.0 | 3.0 | 10.0 | — |  |
| (NaF)$_2$ | — | — | — | — | — | — | — | 3.0 |  |

Li$_2$O . (LiF)$_2$ . Al$_2$O$_3$ . B$_2$O$_3$ Systems

|  | 18 | 19 | 20 | 21 | 22 | 23 | 24 | 25 | 26 |
|---|---|---|---|---|---|---|---|---|---|
| B$_2$O$_3$ | 70.0 | 65.0 | 60.0 | 55.0 | 51.0 | 49.0 | 47.0 | 74.0 | 68.8 |
| Al$_2$O$_3$ | 5.0 | 5.0 | 5.0 | 5.0 | 5.0 | 5.0 | 5.0 | 6.0 | 5.2 |
| Li$_2$O | 25.0 | 30.0 | 35.0 | 40.0 | 44.0 | 46.0 | 48.0 | — | — |
| (LiF)$_2$ | — | — | — | — | — | — | — | 20.0 | 25.0 |
|  | 27 | 28 | 29 | 30 | 31 | 32 | 33 | 34 | 35 |
| B$_2$O$_3$ | 61.7 | 56.7 | 56.7 | 55.6 | 44.5 | 50.0 | 50.0 | 40.0 | 50.0 |
| Al$_2$O$_3$ | 5.0 | 10.0 | 10.0 | 11.1 | 22.2 | 10.0 | 10.0 | 20.0 | 5.0 |
| Li$_2$O | 33.3 | 33.3 | 16.7 | 33.3 | 33.3 | 40.0 | 20.0 | 40.0 | 45.0 |
| (LiF)$_2$ | — | — | 16.7 | — | — | — | 20.0 | — | — |
|  | 36 | 37 | 38 | 39 | 40 | 41 | 42 |  |  |
| B$_2$O$_3$ | 45.0 | 55.0 | 55.0 | 55.0 | 50.0 | 50.0 | 50.0 |  |  |
| Al$_2$O$_3$ | 10.0 | 5.0 | 5.0 | 5.0 | 5.0 | 10.0 | 10.0 |  |  |
| Li$_2$O | 45.0 | 39.0 | 37.0 | 30.0 | 17.5 | 35.0 | 25.0 |  |  |
| (LiF)$_2$ | — | — | — | — | 17.5 | — | 10.0 |  |  |
| (LiCl)$_2$ | — | 1.0 | 3.0 | 10.0 | 10.0 | 5.0 | 5.0 |  |  |

Li$_2$O . (AlF$_3$)$_2$ . B$_2$O$_3$ System

|  | 43 | 44 | 45 | 46 | 47 | 48 | 49 | 50 | 51 |
|---|---|---|---|---|---|---|---|---|---|
| B$_2$O$_3$ | 62.0 | 58.0 | 54.0 | 59.0 | 55.0 | 51.0 | 50.0 | 56.0 | 52.0 |
| (AlF$_3$)$_2$ | 2.0 | 2.0 | 2.0 | 5.0 | 5.0 | 5.0 | 5.0 | 8.0 | 8.0 |
| Li$_2$O | 36.0 | 40.0 | 44.0 | 36.0 | 40.0 | 44.0 | 45.0 | 36.0 | 40.0 |

TABLE I-continued (Mole %)

|  | 52 | 53 | 54 | 55 | 56 | 57 |
|---|---|---|---|---|---|---|
| $B_2O_3$ | 48.0 | 56.7 | 50.0 | 40.0 | 55.0 | 55.0 |
| $(AlF_3)_2$ | 8.0 | 10.0 | 10.0 | 10.0 | 5.0 | 5.0 |
| $Li_2O$ | 44.0 | 33.3 | 40.0 | 50.0 | 39.0 | 30.0 |
| $(LiCl)_2$ | — | — | — | — | 1.0 | 10.0 |

$Li_2O$—F and/or $Al_2O_3$—$B_2O_3$ Glass with Additions

|  | 58 | 59 | 60 | 61 | 62 | 63 | 64 |
|---|---|---|---|---|---|---|---|
| $B_2O_3$ | 56.7 | 56.7 | 50.0 | 54.5 | 54.5 | 54.5 | 54.5 |
| $Al_2O_3$ | 10.0 | 10.0 | 10.0 | — | — | — | — |
| $Li_2O$ | 11.7 | 16.7 | 20.0 | 36.4 | 18.2 | 36.4 | 18.2 |
| $(LiF)_2$ | 16.7 | — | 15.0 | — | 18.2 | — | 18.2 |
| MgO | 5.0 | 16.7 | — | — | — | — | — |
| $MgF_2$ | — | — | 5.0 | — | — | — | — |
| $SiO_2$ | — | — | — | 9.1 | 9.1 | — | — |
| $(AlPO_4)_1$ | — | — | — | — | — | 9.1 | 9.1 |

TABLE IA (Weight %)

$Li_2O \cdot (LiF)_2 \cdot B_2O_3$ System

|  | 1 | 2 | 3 | 4 | 5 | 6 | 7 | 8 | 9 |
|---|---|---|---|---|---|---|---|---|---|
| $B_2O_3$ | 84.3 | 87.2 | 80.1 | 83.6 | 81.0 | 72.9 | 77.3 | 78.9 | 70.4 |
| $Li_2O$ | — | 4.7 | — | 6.0 | 7.0 | — | 8.3 | 11.3 | — |
| LiF | 15.7 | 8.1 | 19.9 | 10.4 | 12.0 | 27.1 | 14.4 | 9.8 | 29.6 |

|  | 10 | 11 | 12 | 13 | 14 | 15 | 16 | 17 |
|---|---|---|---|---|---|---|---|---|
| $B_2O_3$ | 75.2 | 77.8 | 71.8 | 70.5 | 72.5 | 71.8 | 69.3 | 71.8 |
| $Li_2O$ | 9.1 | 14.1 | 10.3 | 7.6 | — | — | — | — |
| $(LiF)_2$ | 15.8 | 8.2 | 17.9 | 21.9 | 26.2 | 24.3 | 18.0 | 24.3 |
| $(LiCl)_2$ | — | — | — | — | 1.3 | 3.9 | 12.7 | — |
| $(NaF)_2$ | — | — | — | — | — | — | — | 3.9 |

$Li_2O \cdot (LiF)_2 \cdot Al_2O_3 \cdot B_2O_3$ System

|  | 18 | 19 | 20 | 21 | 22 | 23 | 24 | 25 | 26 |
|---|---|---|---|---|---|---|---|---|---|
| $B_2O_3$ | 79.5 | 76.3 | 72.9 | 69.2 | 66.1 | 64.4 | 62.7 | 75.8 | 71.2 |
| $Al_2O_3$ | 8.3 | 8.6 | 8.9 | 9.2 | 9.5 | 9.6 | 9.8 | 9.0 | 9.5 |
| $Li_2O$ | 12.2 | 15.1 | 18.2 | 21.6 | 24.5 | 26.0 | 27.5 | — | — |
| LiF | — | — | — | — | — | — | — | 15.2 | 19.3 |

|  | 27 | 28 | 29 | 30 | 31 | 32 | 33 | 34 | 35 |
|---|---|---|---|---|---|---|---|---|---|
| $B_2O_3$ | 74.1 | 66.2 | 62.4 | 64.5 | 48.7 | 61.1 | 56.7 | 46.3 | 65.2 |
| $Al_2O_3$ | 8.8 | 17.1 | 16.1 | 18.9 | 35.6 | 17.9 | 16.6 | 33.9 | 9.6 |
| $Li_2O$ | 17.2 | 16.7 | 7.9 | 16.6 | 15.7 | 21.0 | 9.7 | 19.9 | 25.2 |
| LiF | — | — | 13.7 | — | — | — | 16.9 | — | — |

|  | 36 | 37 | 38 | 39 | 40 | 41 | 42 |
|---|---|---|---|---|---|---|---|
| $B_2O_3$ | 57.0 | 68.5 | 67.2 | 62.9 | 55.5 | 58.3 | 54.3 |
| $Al_2O_3$ | 18.6 | 9.1 | 9.0 | 8.4 | 8.1 | 17.1 | 15.9 |
| $Li_2O$ | 24.5 | 20.9 | 19.4 | 14.7 | 8.3 | 17.5 | 7.0 |
| LiF | — | — | — | — | 14.5 | — | 16.2 |
| LiCl | — | 1.5 | 4.5 | 13.9 | 13.5 | 7.1 | 6.6 |

$Li_2O \cdot (AlF_3)_2 \cdot B_2O_3$ System

|  | 43 | 44 | 45 | 46 | 47 | 48 | 49 | 50 | 51 |
|---|---|---|---|---|---|---|---|---|---|
| $B_2O_3$ | 75.4 | 72.5 | 69.5 | 68.2 | 64.3 | 62.2 | 61.4 | 61.7 | 58.8 |
| $AlF_3$ | 5.9 | 6.0 | 6.2 | 13.9 | 14.3 | 14.7 | 14.8 | 21.3 | 21.8 |
| $Li_2O$ | 18.8 | 21.5 | 24.3 | 17.8 | 20.4 | 23.0 | 23.7 | 17.0 | 19.4 |

|  | 52 | 53 | 54 | 55 | 56 | 57 |
|---|---|---|---|---|---|---|
| $B_2O_3$ | 55.7 | 59.6 | 54.8 | 46.7 | 64.7 | 59.7 |
| $AlF_3$ | 22.4 | 25.4 | 26.4 | 28.2 | 14.2 | 13.1 |
| $Li_2O$ | 21.9 | 15.0 | 18.8 | 25.1 | 19.7 | 14.0 |
| LiCl | — | — | — | — | 1.4 | 13.2 |

$Li_2O$—F and/or $Al_2O_3$—$B_2O_3$ Glass with Additions

|  | 58 | 59 | 60 | 61 | 62 | 63 | 64 |
|---|---|---|---|---|---|---|---|
| $B_2O_3$ | 61.9 | 64.3 | 56.2 | 69.9 | 65.1 | 69.8 | 65.0 |
| $Al_2O_3$ | 16.0 | 16.6 | 16.5 | — | — | — | — |
| $Li_2O$ | 4.6 | 8.1 | 9.7 | 20.0 | 20.0 | 9.3 | — |
| LiF | 13.6 | — | 12.6 | — | 16.2 | — | 16.2 |
| MgO | 3.2 | 11.0 | — | — | — | — | — |
| $MgF_2$ | — | — | 5.0 | — | — | — | — |
| $SiO_2$ | — | — | — | 10.1 | 9.4 | — | — |
| $AlPO_4$ | — | — | — | — | — | 10.2 | 9.5 |

Table II reports a visual description of the glass slabs prepared from the compositions of Table I along with a number of physical property measurements determined in the conventional manner on the glass samples. The resistance of the glasses to attack by water, while not directly predicting durability vis-a-vis molten lithium metal or sulfides, does provide a means for comparing relative chemical durability among the several glasses.

The weight loss (Wt. Loss) after immersion in stirred H₂O for 16 hours at room temperature is recorded in terms of %. The annealing point (Ann. Pt.) and strain point (Str. Pt.) are tabulated in °C. The coefficient of thermal expansion (Exp.) was measured over the range of 0°–300° C. and is reported in terms of $\times 10^{-7}/°C$. The electrical resistivities (Elect. Res.) are recorded in terms of Log $\rho$ and were measured at 25° C., 100° C., and 200° C.

TABLE II

| Ex. No. | Wt. Loss | Ann. Pt. | Str. Pt. | Exp. | Log ρ 25° | Log ρ 100° | Log ρ 200° | Visual Appearance |
|---|---|---|---|---|---|---|---|---|
| | $Li_2O \cdot (LiF)_2 \cdot B_2O_3$ System |
| 1 | — | 388 | 358 | 96 | 12.05 | 9.78 | 7.88 | Clear Glass |
| 2 | — | 390 | 358 | 85 | 14.79 | 11.50 | 8.73 | Clear Glass |
| 3 | 1.14 | 415 | — | — | 12.71 | 9.44 | 6.71 | Clear Glass |
| 4 | 0.83 | — | — | — | — | — | — | Clear Glass |
| 5 | — | — | — | — | 11.93 | 8.88 | 6.24 | Clear Glass |
| 6 | 1.28 | 384 | 359 | 104 | 10.01 | 7.39 | 5.20 | Clear Glass |
| 7 | 0.90 | — | — | — | 10.55 | 7.98 | 5.82 | Clear Glass |
| 8 | — | — | — | — | — | — | — | Clear Glass + Slight Devitrification |
| 9 | — | — | — | — | — | — | — | Clear Glass + Top (Air) Surface Devitrification |
| 10 | 0.71 | 405 | 382 | 105 | 9.89 | 7.44 | 5.39 | Clear Glass |
| 11 | — | — | — | — | — | — | — | Devitrification + Some Glass |
| 12 | — | — | — | — | — | — | — | Clear Glass + Top (Air) Surface Devitrification |
| 13 | — | — | — | — | 8.75 | 6.46 | 4.55 | Clear Glass + Large Crystals in Top (Air) Surface |
| 14 | — | — | — | — | 10.23 | 7.76 | 5.67 | Clear Glass + Slight Spots of Devitrification |
| 15 | — | — | — | — | 10.16 | 7.69 | 5.61 | Clear Glass |
| 16 | — | — | — | — | 9.15 | 6.79 | 4.80 | Clear Glass |
| 17 | — | — | — | — | 15.37 | 11.96 | 9.09 | Clear Glass |
| | $Li_2O \cdot (LiF)_2 \cdot Al_2O_3 \cdot B_2O_3$ System |
| 18 | 0.4 | 470 | 445 | 83 | 12.39 | 9.49 | 7.06 | Clear Glass |
| 19 | 0.5 | 468 | 443 | 90 | 10.83 | 8.25 | 6.08 | Clear Glass |
| 20 | 0.5 | 455 | 433 | 100 | 9.71 | 7.33 | 5.32 | Clear Glass |
| 21 | 1.0 | 435 | 411 | 110 | 8.62 | 6.39 | 4.53 | Clear Glass |
| 22 | 1.5 | 413 | 394 | 118 | 8.25 | 6.14 | 4.38 | Clear Glass |
| 23 | 2.2 | 410 | — | 130 | 8.05 | 5.97 | 4.23 | Clear Glass |
| 24 | — | — | — | — | — | — | — | Clear Glass + Bottom Surface (Mold) Opal |
| 25 | 0.83 | 389 | 358 | 84 | 14.52 | 11.16 | 8.34 | Clear Glass |
| 26 | 0.78 | — | — | — | 13.42 | 10.23 | 7.55 | Clear Glass |
| 27 | 0.89 | — | — | 90 | 10.12 | 7.66 | 5.59 | Clear Glass + Slight Bottom Surface (Mold) Devitrification |
| 28 | 0.75 | 447 | 422 | 88 | 10.93 | 8.22 | 5.95 | Clear Glass |
| 29 | 0.36 | 397 | 373 | 104 | 10.38 | 7.78 | 5.61 | Clear Glass + Slight Bottom Surface (Mold) Devitrification |
| 30 | 0.32 | 444 | 419 | 98 | 11.37 | 8.51 | 6.11 | Clear Glass |
| 31 | 0.03 | 427 | 400 | 95 | 11.66 | 8.81 | 6.43 | Clear Glass |
| 32 | 0.81 | 416 | 392 | 102 | 9.37 | 7.07 | 5.13 | Clear Glass |
| 33 | 0.35 | — | — | — | 8.05 | 5.97 | 4.23 | Slight Haze |
| 34 | 0.10 | 401 | 378 | 101 | 11.02 | 8.15 | 5.73 | Clear Glass + Slight Bottom Surface (Mold) Devitrification |
| 35 | 1.53 | 409 | 388 | 121 | 8.23 | 6.12 | 4.35 | Clear Glass + Slight Bottom Surface (Mold) Devitrification |
| 36 | 1.27 | — | — | — | 8.66 | 6.54 | 4.76 | Clear Glass + Bottom Surface (Mold) Devitrification |
| 37 | — | — | — | — | 8.74 | 6.60 | 4.81 | Clear Glass + Slight Devitrification |
| 38 | — | — | — | — | — | — | — | Clear Glass |
| 39 | 1.28 | 416 | 391 | 114 | 7.57 | 5.67 | 4.08 | Clear Glass + Bottom Surface (Mold) Haze |
| 40 | 1.61 | 355 | — | 125 | 8.25 | 6.50 | 5.04 | Clear Glass + Hazy Skin |
| 41 | 1.17 | — | — | 110 | 8.49 | 6.48 | 4.79 | Clear Glass + Bottom Surface (Mold) Hazy Spots |
| 42 | 0.41 | — | — | — | 9.09 | 6.79 | 4.85 | Clear Glass + Bottom Surface (Mold) Haze |
| | $Li_2O \cdot (AlF_3)_2 \cdot B_2O_3$ System |
| 43 | 0.6 | — | — | — | — | — | — | Clear Glass + Devitrification |
| 44 | — | — | — | — | — | — | — | Devitrification + Glass |
| 45 | 0.95 | 411 | 389 | — | 8.13 | 6.07 | 4.34 | Clear Glass + Devitrification |
| 46 | 0.25 | — | — | — | — | — | — | Clear Glass |
| 47 | 0.29 | 399 | 377 | 113 | 9.10 | 6.82 | 4.91 | Clear Glass |
| 48 | 0.74 | 390 | 367 | — | 8.57 | 6.33 | 4.46 | Devitrification + Glass |
| 49 | — | — | — | 116 | 8.24 | 6.15 | 4.35 | Clear Glass + Slight Bottom Surface (Mold) Devitrification |
| 50 | 0.15 | — | — | — | — | — | — | Clear Glass |
| 51 | — | — | — | — | — | — | — | Top (Air) Surface Devitrification + Glass |
| 52 | — | — | — | — | — | — | — | Devitrification + Glass |
| 53 | — | — | — | — | — | — | — | Devitrification |
| 54 | — | — | — | — | — | — | — | Devitrification |
| 55 | — | — | — | — | — | — | — | Devitrification |

TABLE II-continued

| | | | | | | | | |
|---|---|---|---|---|---|---|---|---|
| 56 | — | — | — | — | 8.95 | 6.80 | 5.00 | Clear Glass + Slight Surface (All) Haze |
| 57 | — | — | — | — | 8.40 | 0.23 | 4.41 | Clear Glass + Slight Bottom Surface (Mold) Devitrification |
| | | | Li$_2$O—F and/or Al$_2$O$_3$—B$_2$O$_3$ Glass with Additions | | | | | |
| 58 | 0.13 | 425 | — | — | 15.81 | 11.14 | 7.23 | Clear Glass |
| 59 | 0.19 | 505 | — | — | 15.59 | 11.95 | 8.91 | Clear Glass |
| 60 | 0.21 | 393 | 371 | — | 10.48 | 7.81 | 5.58 | Clear Glass + Slight Surface (All) Devitrification |
| 61 | 0.37 | 473 | 451 | 106 | 10.58 | 8.05 | 5.92 | Clear Glass |
| 62 | 0.22 | — | — | — | 10.44 | 7.84 | 5.66 | Clear Glass + Slight Bottom Surface (Mold) Haze |
| 63 | 0.63 | — | — | — | 8.60 | 6.43 | 4.61 | Clear Glass |
| 64 | 0.49 | — | — | — | — | — | — | Clear Glass + Bottom Surface (Mold) Devitrification |

As can be observed from a combined reading of Tables I and II, clear glasses can readily be achieved in the Li$_2$O·(LiF)$_2$·B$_2$O$_3$ system up to a combined lithium level, i.e., Li$_2$O+(LiF)$_2$, of about 36 mole percent. At that level, exhibited by Example 10, equimolar Li$_2$O and (LiF)$_2$ is demanded for clear glass. Excess LiF causes extensive LiF surface devitrification whereas excess Li$_2$O causes internal devitrification of lithium borate species, Examples 9 and 11. Higher total lithium levels are generally unstable toward devitrification upon cooling from the melt.

Notwithstanding the foregoing circumstances, clear glasses can be obtained in the Li$_2$O·(LiF)$_2$·B$_2$O$_3$ system up to a combined lithium level, i.e., Li$_2$O+(LiF)$_2$, of at least about 40 mole percent in articles of small bulk, e.g., fibers or thin-walled tubing, or by utilizing forming techniques wherein the glass melt is cooled quite rapidly to avoid devitrification.

The physical properties do not vary significantly over the glass-forming range although glasses having a higher total lithium concentration do demonstrate somewhat higher coefficients of thermal expansion. Electrical resistivity decreases as the lithium level is increased. Example 13, taken from the clear glass area, exhibits the lowest resistivity of this composition system although the heavily chlorided Example 16 possesses a markedly lower resistivity than the comparable chloride-free Example 6. The striking effect which mixed alkali has upon resistivity can be observed through a comparison of Example 17, 3 mole percent (NaF)$_2$1-(LiF)$_2$, with the Na$_2$O-free Example 6. Hence, the resistivity of Example 17 is increased four orders of magnitude.

Examples 18-24 illustrate the effects of decreasing the B$_2$O$_3$/Li$_2$O ratio in a series of glasses stabilized against devitrification via five mole percent Al$_2$O$_3$. This technique permits the incorporation of up to about 46 mole percent Li$_2$O in a clear glass. As the Li$_2$O content increases, the annealing and strain points become lower, thereby suggesting that Li$_2$O is behaving as a conventional flux. More importantly, however, electrical resistivity decreases rapidly to about 40 mole percent Li$_2$O and more slowly thereafter. At 400° C., Example 23 has an extrapolated resistivity, $\rho$, of about 197 ohm-cm. At the same temperature, $\beta$-alumina has a $\rho$ of less than about 10 ohm-cm, but lithium aluminosilicate glasses have a $\rho$ of about 1000 ohm-cm.

A comparison of Examples 27, 28, 30, and 31 manifests the increase in resistivity which accompanies the substitution of Al$_2$O$_3$ for B$_2$O$_3$. This behavior, coupled with the modest decrease in annealing and strain points, indicates that at least some of the Al$^{+3}$ ions must be forced into an octahedral, modifying position, thereby impeding Li$^{30}$ ion mobility. A similar effect can be observed via a comparison of Examples 21, 32, and 34. The inclusion of Al$_2$O$_3$ in amounts of 10% by weight and greater frequently leads to a significant increase in electrical resistivity. This effect can be counteracted, however, via the incorporation of fluoride or the use of large quantities of Li$_2$O, viz., greater than 20% by weight, as is evidenced by the pairs of Examples 28-29 and 32-33. Finally, inclusion of the chloride ion appears to cause a decrease in resistivity, particularly in the region of 5-10 mole percent (LiCl)$_2$/Li$_2$O. This can be seen in a study of Examples 21, 39 and 32, 41, 42.

The clear glass-forming region of the Li$_2$O·(AlF$_3$)$_2$·B$_2$O$_3$ system is rather limited but low resistivity glasses such as Examples 45 and 47-49 can be produced. Again, 10 mole percent of (LiCl)$_2$/Li$_2$O reduces the electrical resistivity, as is illustrated by Examples 47 and 57. Examples 52-55 illustrate the lack of glass stability resulting from high Al$_2$O$_3$ contents even with correspondingly high fluoride and Li$_2$O values.

A comparison of Examples 58 and 59 with Example 29 demonstrates that the molar substitution of MgO for Li$_2$O or (LiF)$_2$ increases the electrical resistivity of the glass. That a similar increase in resistivity also occurs when MgF$_2$ is substituted for (LiF)$_2$ on a molar basis is manifested via a comparison of Example 60 with Example 33.

The addition of SiO$_2$ appears to play two roles. Not only is the electrical resistivity increased, but also SiO$_2$ appears to stabilize the glass against devitrification in a manner similar to that demonstrated by Al$_2$O$_3$.

Example 63 points out that additions of AlPO$_4$ maintain low electrical resistivity more effectively than do silica additions or the other substitutions discussed above. Furthermore, AlPO$_4$ also helps to stabilize the glass against devitrification.

The measured water durability of the reported lithium borate-based glasses is surprisingly good inasmuch as sodium borate-based glasses of like molar proportions exhibit losses ranging between about 12-57% by weight when tested in accordance with the same procedure.

In general, alkali metal oxides other than Li$_2$O are to be avoided because of the strong mixed alkali effect noted in Example 17. Other constituents such as the alkaline earth oxides, SiO$_2$, and AlPO$_4$ should be incorporated sparingly, if at all, to avoid excessive increases in resistivity. Thus, whereas the addition of such components can be useful in small amounts to improve glass stability, chemical durability, to modify the coefficient of thermal expansion, etc., larger amounts objectionably hazard an increase in electrical resistivity. Therefore, the total of all such extraneous additions will be held below about 10 mole percent and, most preferably, below about 5 mole percent. Chloride, however, can be useful in amounts up to about 10 mole percent, expressed as $(LiCl)_2$, in providing a lowering effect upon resistivity.

Table III records a number of other physical properties measured in the conventional manner on several of the exemplary compositions recited in Table I. Such properties include density (g/cm$^3$), refractive index ($n_D$), Young's modulus ($\times 10^6$ psi), shear modulus ($\times 10^6$ psi), and Poisson's ratio.

TABLE III

| Example No. | Density | $n_D$ | Young's Modulus | Shear Modulus | Poisson's Ratio |
|---|---|---|---|---|---|
| 3 | 2.182 | 1.516 | 9.2 | 3.6 | 0.28 |
| 6 | 2.239 | 1.516 | 10.5 | 4.1 | 0.28 |
| 10 | 2.247 | 1.525 | 11.2 | 4.4 | 0.27 |
| 18 | 2.118 | 1.536 | 9.7 | 3.8 | 0.28 |
| 19 | 2.243 | 1.549 | 11.1 | 4.4 | 0.27 |
| 20 | 2.281 | 1.559 | 12.2 | 4.8 | 0.26 |
| 21 | 2.293 | 1.567 | 12.9 | 5.1 | 0.28 |
| 22 | 2.289 | 1.567 | 12.6 | 4.9 | 0.27 |
| 23 | 2.280 | 1.569 | 12.8 | 5.0 | 0.27 |
| 32 | 2.300 | 1.564 | 12.2 | 4.4 | 0.27 |
| 34 | 2.306 | 1.560 | 11.7 | 4.6 | 0.26 |
| 35 | 2.288 | 1.568 | 12.5 | 5.0 | 0.26 |

An examination of the data reported in Table III in combination with those set forth in Tables I and II points up three significant factors:

First, the inventive glasses exhibit unusually high refractive index/density and Young's modulus/density ratios.

Second, Young's modulus reaches a peak at about 40 mole percent $Li_2O$. This level corresponds to the maximum number of tetrahedrally coordinated boron atoms caused by the addition of $Li_2O$. An inspection of Examples 18-23 of Table II indicates that $Li_2O$ is acting in the manner of a conventional flux. Yet, the elasticity data coincide with an increase in the number of boron tetrahedra to at least 40 mole percent $Li_2O$, as is evidenced by Example 21. No satisfactory explanation has been propounded for this apparent anomaly.

Third, an inspection of the physical property measurements reported for Examples 21, 32, 34, and 35 indicates that increasing $Al_2O_3$ contents do not stiffen or harden these glasses, i.e., $Al_2O_3$ does not play its customary role in these glass compositions. Instead, increasing $Al_2O_3$ contents soften the glasses, decrease elasticity and refractive index, and increase electrical resistivity significantly. Aluminum cannot follow boron into triangular-planar coordination. If it cannot displace boron from tetrahedral sites in the glass structure, it must occupy six-fold coordinated modifying positions to account for the observed physical properties. On the other hand, if aluminum does displace boron in tetrahedral coordination, the observed changes in properties may be associated with the fluxing action of boron in triangular-planar coordination.

In terms of the lowest electrical resistivity, viz., a Log $\rho$ at 25° C. less than 11 and, desirably, less than 10, coupled with good chemical durability, low temperature melting capabilities, and excellent glass stability, a review of Tables I-III indicates that the most preferred glasses will be essentially free from silica, alkaline earth metal oxides, and alkali metal oxides other than $Li_2O$ and will be selected from the following groups, their compositions consisting essentially of the stated proportions expressed in terms of weight percent on the oxide basis as calculated from the batch of:

(a) 0-9.1% $Li_2O$, 14.4-27.1% LiF, 18-29.5% $Li_2O$+LiF, 0-12.7% LiCl, and 69.3-77.3% $B_2O_3$; and (b) 0-26.0% $Li_2O$, 0-16.9% LiF, 0-13.9% Cl, 17.2-36.3% $Li_2O$+LiF+LiCl, 0-18.6% $Al_2O_3$, but <10% $Al_2O_3$ when F and/or Cl are absent and $Li_2O$ is no more than 20%, 0-14.8% $AlF_3$, 6.2-18.6% $Al_2O_3$+$AlF_3$, and 54.3-74.1% $B_2O_3$.

We claim:

1. Solid membrane electrolyte-separators for use in liquid lithium - sulfur batteries which membranes are glass compositions exhibiting an electrical resistivity in terms of log $\rho$ measured at 25° C. of less than 10, good chemical durability, low temperature melting capability, and excellent glass stability, said glasses being essentially free from silica, alkaline earth metal oxides, and alkali metal oxides other than $Li_2O$ and being selected from the following groups wherein the compositions consist essentially of the stated proportions expressed in terms of weight percent on the oxide basis as calculated from the batch of:

(a) 0-9.1% $Li_2O$, 14.4-27.1% LiF, 18-29.5% $Li_2O$+LiF, 0-12.7% LiCl, and 69.3-77.3% $B_2O_3$; and (b) 0-26.0% $Li_2O$, 0-16.9% LiF, 0-13.9% LiCl, 17.2-36.3% $Li_2O$+LiF+LiCl, 0-18.6% $Al_2O_3$, but <10% $Al_2O_3$ when F and/or Cl are absent and $Li_2O$ is no more than 20%, 0-14.8% $AlF_3$, 6.2-18.6% $Al_2O_3$+$AlF_3$, and 54.3-74.1% $B_2O_3$.

* * * * *